Nov. 23, 1954     F. W. FRETTER     2,695,172
PIN SETTING MACHINE
Original Filed Aug. 9, 1944     10 Sheets-Sheet 1
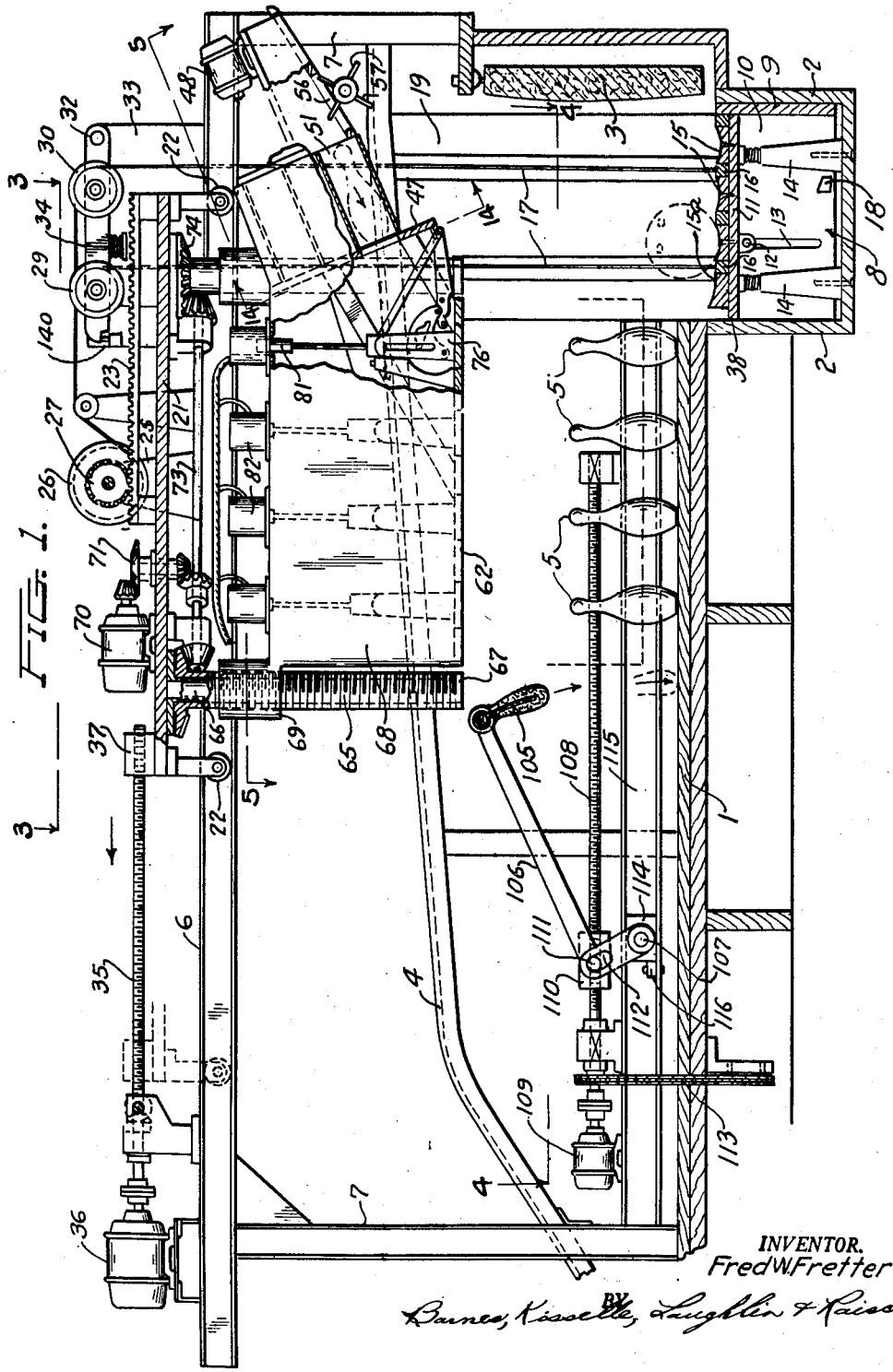
INVENTOR.
Fred W. Fretter

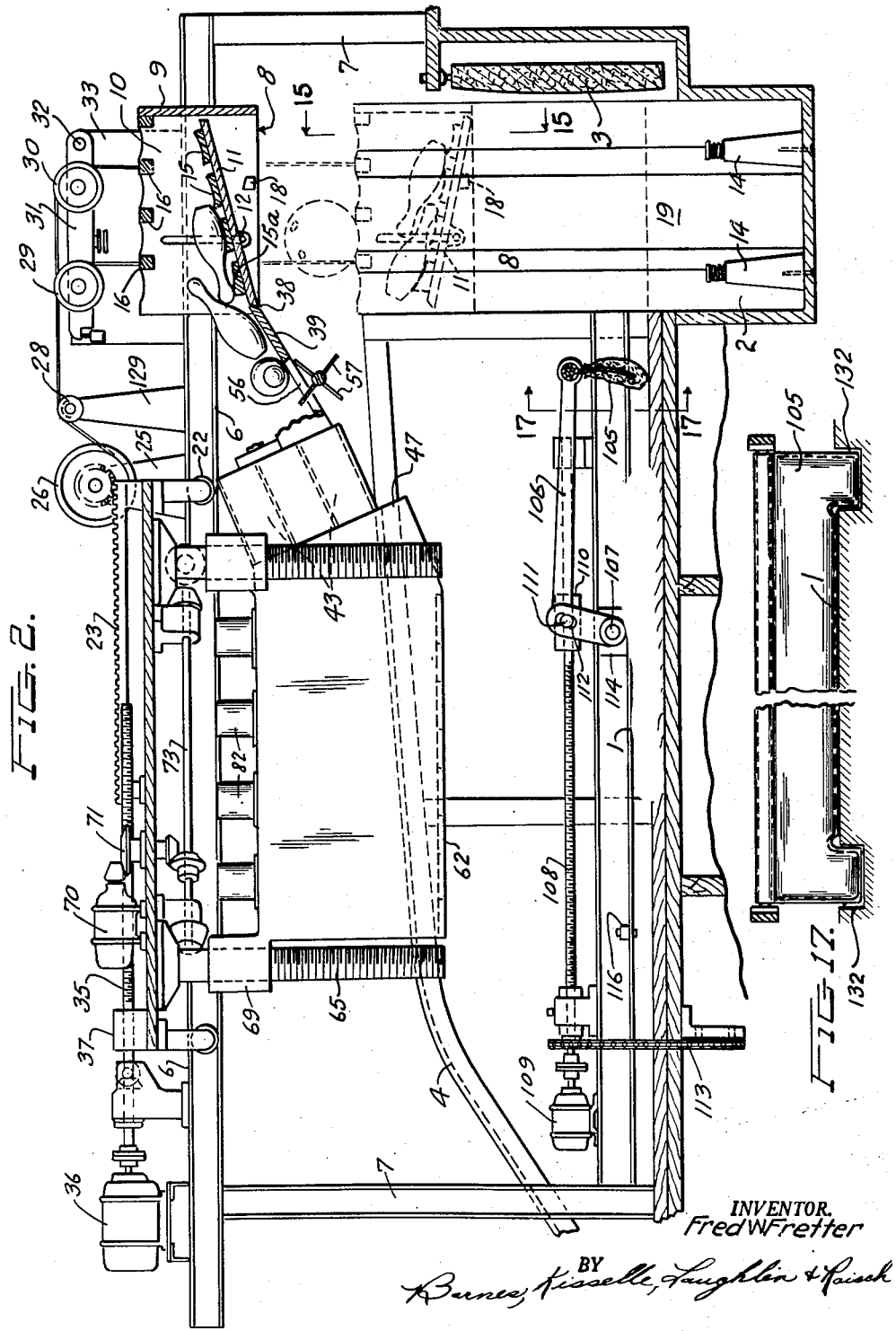

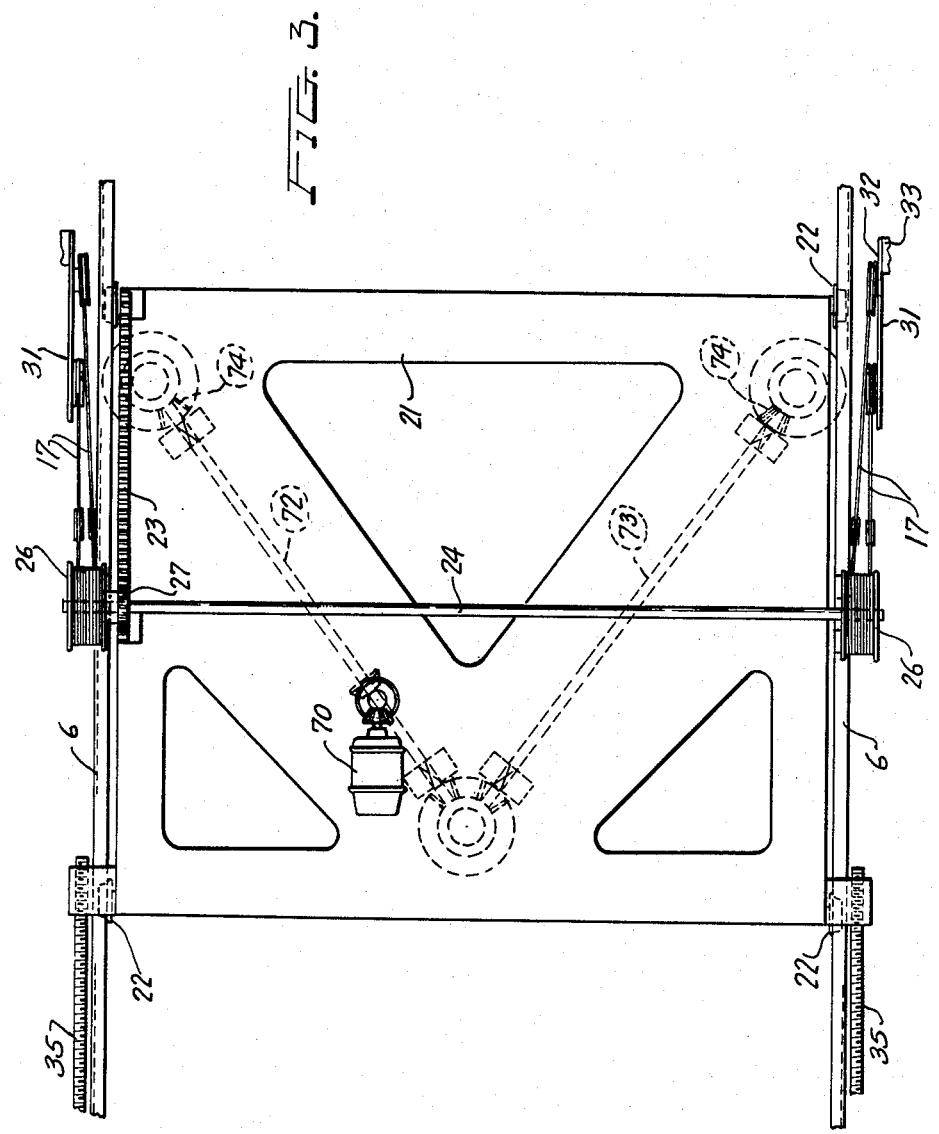

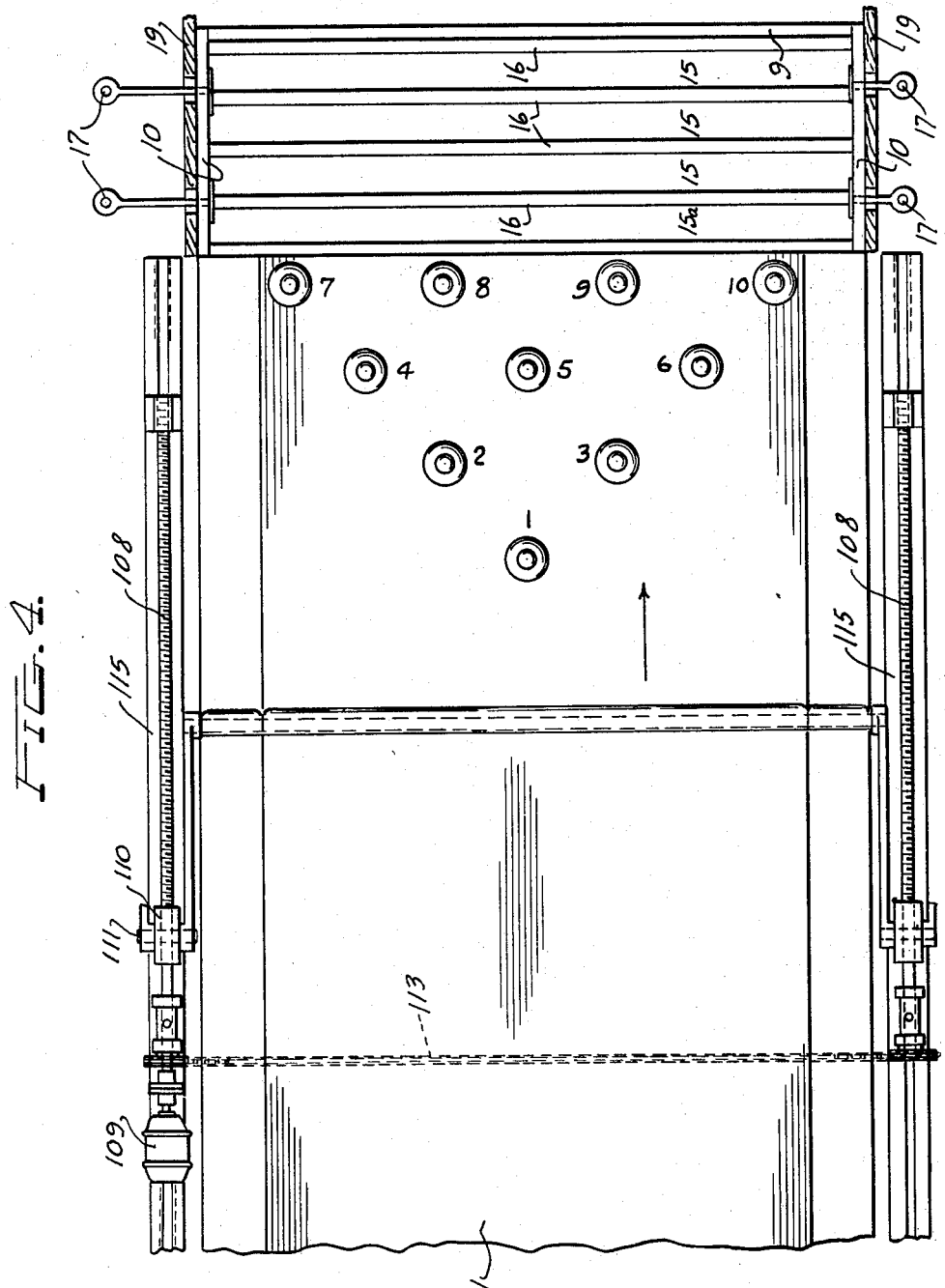

Nov. 23, 1954     F. W. FRETTER     2,695,172
PIN SETTING MACHINE
Original Filed Aug. 9, 1944     10 Sheets-Sheet 5
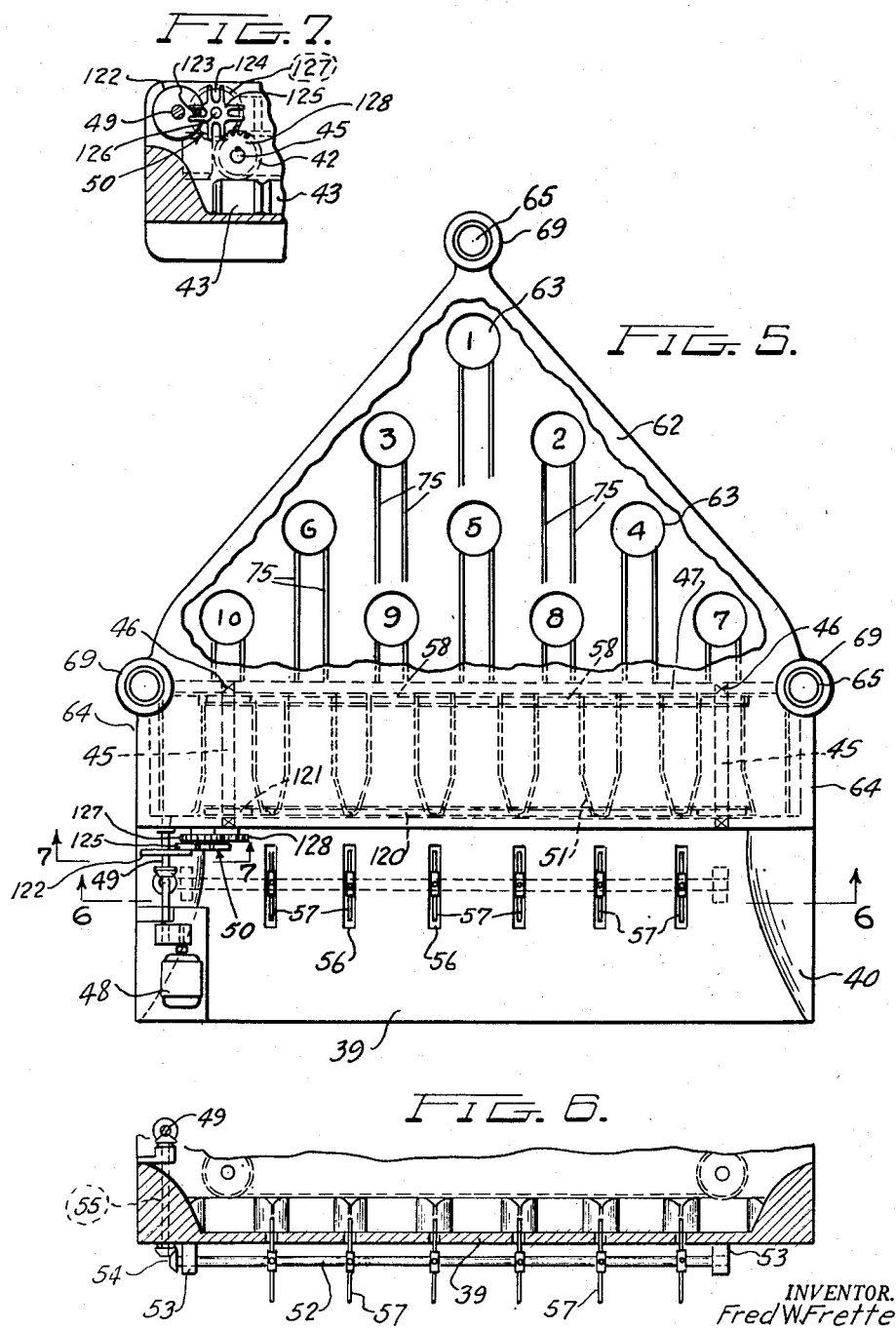
INVENTOR.
Fred W. Fretter

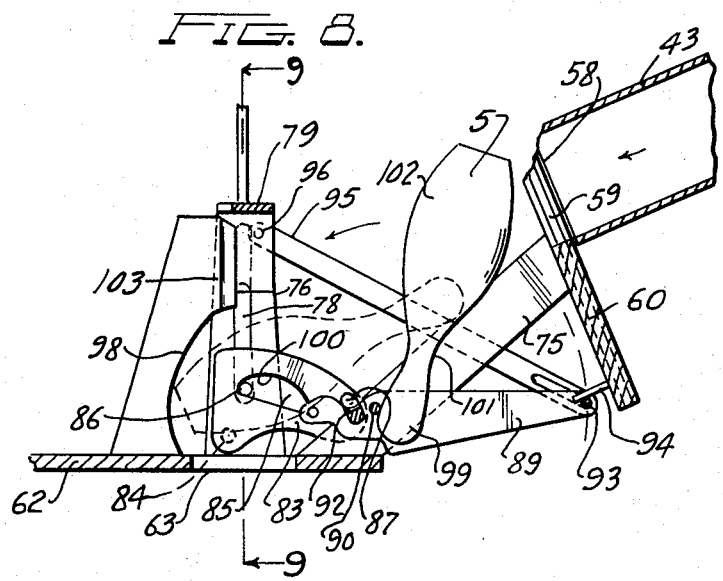
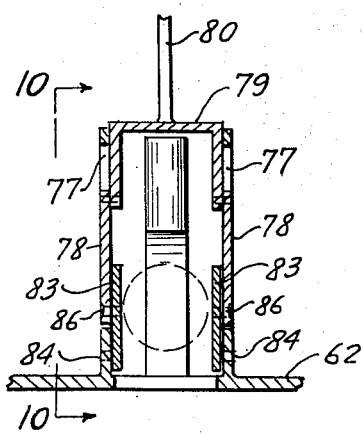
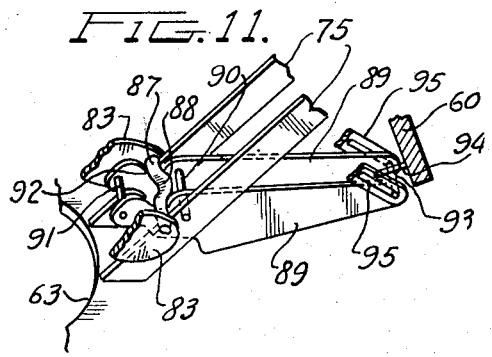
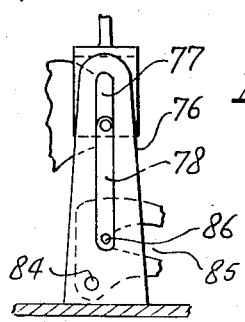

Nov. 23, 1954     F. W. FRETTER     2,695,172
PIN SETTING MACHINE
Original Filed Aug. 9, 1944     10 Sheets-Sheet 7
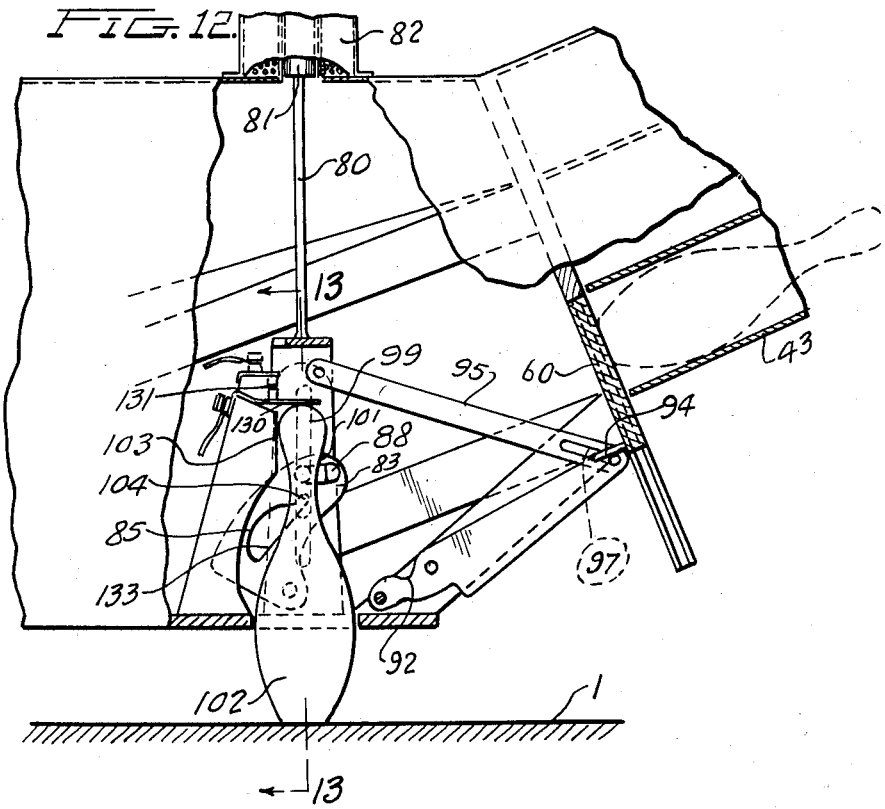
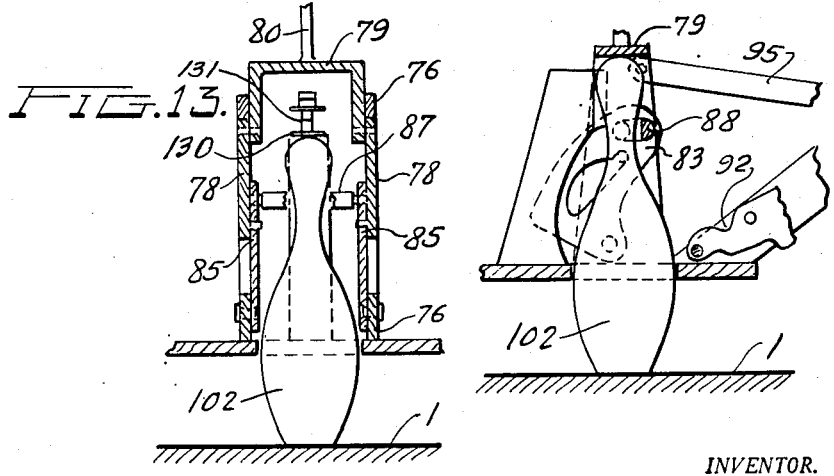
INVENTOR.
Fred W. Fretter
BY
Attorneys Nov. 23, 1954     F. W. FRETTER     2,695,172
PIN SETTING MACHINE
Original Filed Aug. 9, 1944     10 Sheets-Sheet 8
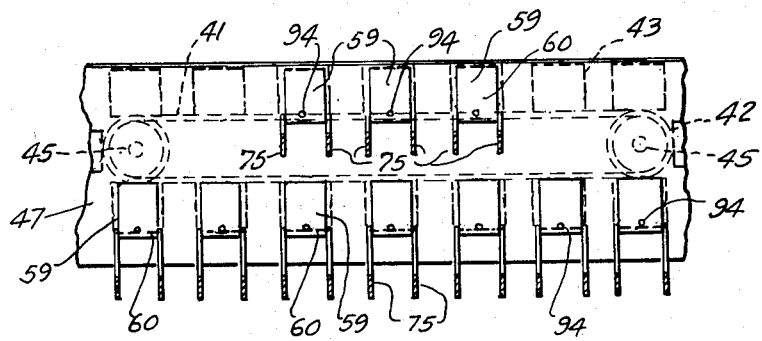
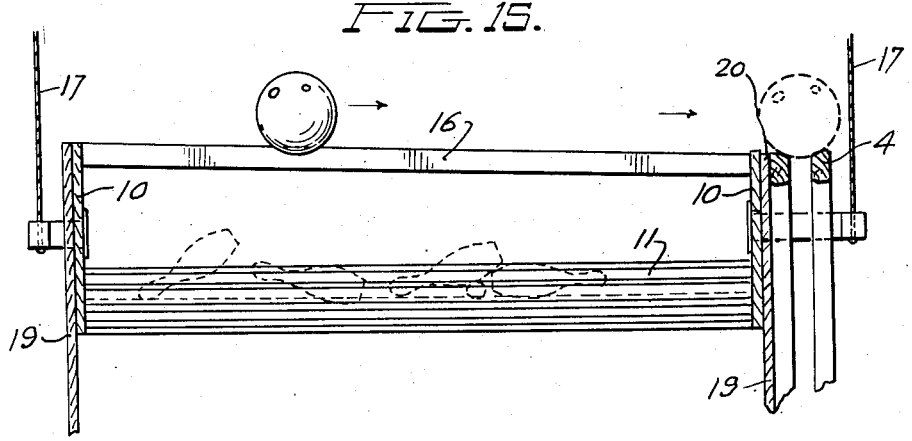
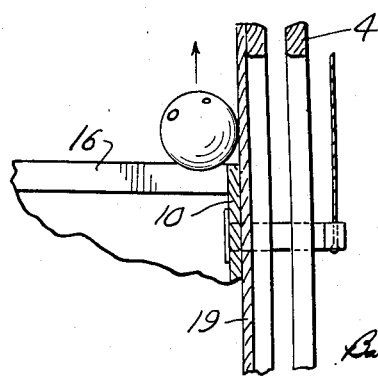
INVENTOR.
Fred W. Fretter
BY
Attorneys Nov. 23, 1954 F. W. FRETTER 2,695,172
PIN SETTING MACHINE
Original Filed Aug. 9, 1944 10 Sheets-Sheet 9
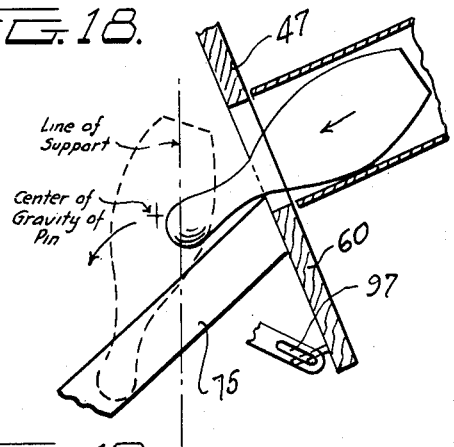
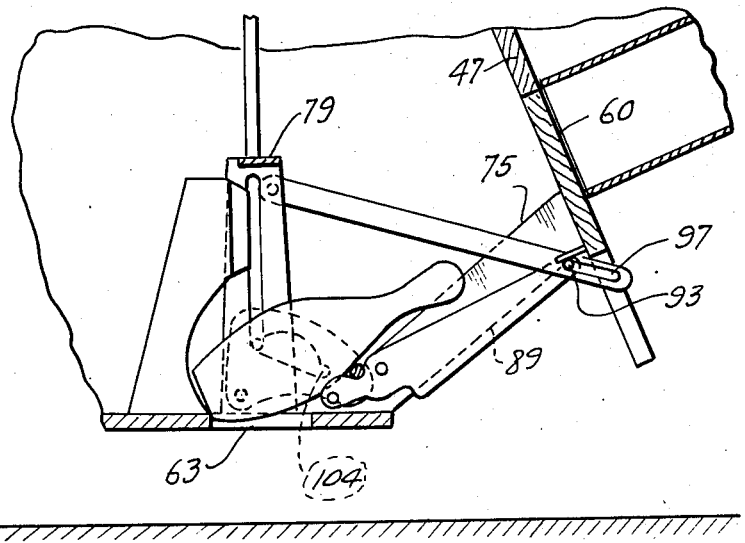
INVENTOR.
Fred W. Fretter Nov. 23, 1954     F. W. FRETTER     2,695,172
PIN SETTING MACHINE Original Filed Aug. 9, 1944     10 Sheets—Sheet 10

INVENTOR.
Fred W. Fretter
BY
Attorneys

United States Patent Office 2,695,172
Patented Nov. 23, 1954

2,695,172

PIN SETTING MACHINE

Fred W. Fretter, Detroit, Mich.

Original application August 9, 1944, Serial No. 548,676, now Patent No. 2,518,457, dated August 15, 1950. Divided and this application August 11, 1950, Serial No. 178,858

6 Claims. (Cl. 273—43)

This invention relates to a pin setting machine for a bowling alley and is more particularly concerned with a pin setting machine which lends itself very readily to automatic operation.

This application is a division of my copending application Serial No. 548,676 filed August 9, 1944, now Patent No. 2,518,457, dated August 15, 1950.

It is the object of this invention to produce a pin setting machine for a bowling alley which is relatively simple in structure, efficient in operation and which will handle the pins expeditiously according to the requirements of the game.

The invention also contemplates a pin setting mechanism which is admirably adapted for automatic control and operation under all the various conditions arising during play.

In the drawings:

Fig. 1 is a side elevation partly in longitudinal section of my bowling pin set-up mechanism showing the pins in position ready for play.

Fig. 2 is a side elevation partly in longitudinal section showing my pin set-up mechanism after the balls have been played and in the operation of setting up the pins.

Fig. 3 is a top plan view along the line 3—3 of Fig. 1.

Fig. 4 is a horizontal section along the line 4—4 of Fig. 1.

Fig. 5 is a section along the line 5—5 of Fig. 1.

Fig. 6 is a section along the line 6—6 of Fig. 5.

Fig. 7 is a section along the line 7—7 of Fig. 5.

Figs. 8, 9, 10 and 11 are details of the mechanism for setting the pin top-end up in the pin set-up mechanism; Fig. 9 being a section along the line 9—9 of Fig. 8; Fig. 10 being a view along the line 10—10 of Fig. 9.

Fig. 12 is a sectional detail showing the pin set-up mechanism setting the pin upright on the bowling alley.

Fig. 13 is a section along the line 13—13 of Fig. 12.

Fig. 14 is a section along the line 14—14 of Fig. 1.

Fig. 15 is a section along the line 15—15 of Fig. 2 showing the ball return mechanism as the ball enters the return groove or track.

Fig. 16 is a fragmentary view of the ball return mechanism just prior to the time the ball enters the return chute.

Fig. 17 is a section along the line 17—17 of Fig. 2.

Fig. 18 is a detail showing the pin in full lines about to leave the distributor belt top foremost, and in the dotted lines showing the pin tumbling down the inclined track and being turned bottom end first.

Fig. 19 is a detail showing the pin at the bottom of an inclined track after the weight of the pin has closed the door barring exit of any other pin from the distributor belt down the same track.

Figure 20:
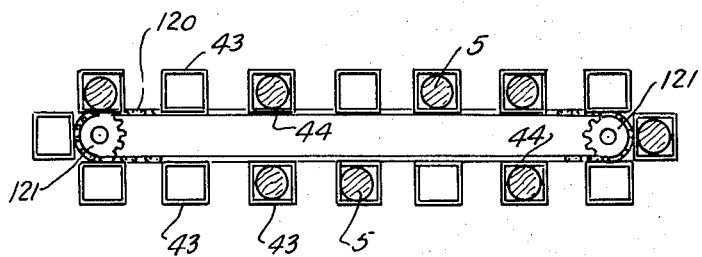

Fig. 20 is a perspective of the sprocket and chain propelled conveyor belt.

Figure 21:
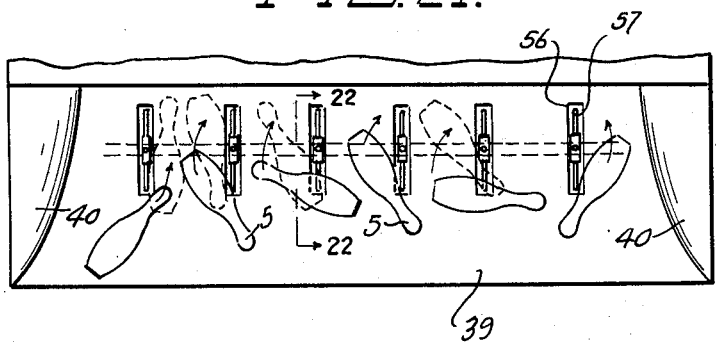

Fig. 21 is a top plan view showing the agitator arranging the pins for entry into the pockets of the distributor.

Figure 22:
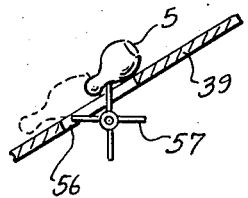

Fig. 22 is a detail section showing the pins being acted upon by the agitator fingers as they slide down the inclined platform preparatory to entering the distributor pockets.

Fig. 23 is a detail showing a modified form of means for automatically locking the pin in the pin setter.

Referring more particularly to the drawings there is shown a conventional bowling alley 1, a stationary pit 2 at the end thereof, a back cushion or stop 3, the conventional inclined return chute or groove 4 along which the ball returns back to the player, and the usual ten bowling pins 5 in position for play, Fig. 1.

The pin set-up mechanism is mounted upon a stationary frame comprising two elevated horizontal tracks 6 supported upon vertical posts 7. The pin set-up mechanism can be divided into four component mechanisms; namely, a pin elevator, a pin distributor, a pin-set-up rack, and a pin sweeper.

Pin elevator

The pin elevator comprises a box 8 which is arranged to be lowered into the ball pit 2, Fig. 1. The box 8 comprises a rear wall 9, two side walls 10, and a bottom wall 11 which is pivoted on a transverse shaft 12. The opposite ends of the shaft 12 slidably engage the side walls 10 with a lost motion connection in slots 13. In its lowered position the floor 11 rests on the spring stops 14 which are fixed to the bottom of pit 2. The floor 11 comprises a plurality of spaced slats 15 extending transversely of box 8, the top face of the front slat 15a being inclined downwardly toward the rear of the box.

Box 8 has its upper end traversed by a plurality of parallel bars 16 which run transversely of alley 1 and are secured at their opposite ends to the top of the side walls 10 of the box. Bars 16 are spaced one behind the other a distance slightly greater than the diameter of the body of a standard bowling pin. Transverse bars 15 of floor 11 fit in between the bars 16 so that the bars 15 and 16 cooperate in lowered position to form a solid floor (yieldably supported by spring stops 14) upon which the ball falls as it rolls off the rear end of the alley 1. The box 8 is arranged to be elevated by means of four cables 17, two secured to each of the sides 10. As box 8 is elevated, floor 11 remains upon stops 14 until shaft 12 strikes the bottom of laterally opposed slots 13 in side walls 10 whereupon bottom 11 tilts downwardly and rearwardly against stops 18 on side walls 10 and then travels upwardly with box 8. Shaft 12 is positioned forwardly of the middle of floor 11 so that the portion of floor 11 to the rear of shaft 12 is heavier than that in front of the shaft 12 so that floor 11 normally tilts rearwardly and downwardly as indicated. A spring can also be used for biasing or tilting floor 11 to this position. The side walls of pit 2 are designated 19 and at one end of the pit the wall 19 extends upwardly so that the top edge 20 is flush with the ball return chute 4, Fig. 15. Thus, side walls 19 serve as a guide for the elevator box 8. Rack bars 16 are inclined downwardly toward return chute 4 so that the bowling ball will roll by gravity off of rack 16 into return chute 4 as soon as the rack 16 is elevated to a position flush with the upper end 20 of side wall 19, Fig. 15.

The mechanism for raising and lowering elevator 8 comprises a carriage 21 supported upon wheels 22 which travel back and forth in trackways 6, Figs. 1, 2 and 3. A gear rack 23 is fixed lengthwise along one edge of the carriage 21. A shaft 24 is journalled at its opposite ends in upright brackets 25 fixed to the stationary track members 6. Drums 26 are fixed at opposite ends of shaft 24. Shaft 24 has fixed thereto a gear 27 (Fig. 3) which meshes with gear rack 23. Cables 17 are arranged to be wound up on drums 26 and have their opposite ends secured to the box 8. Cables 17 run over idler pulleys 28 mounted upon brackets 129 fixed to tracks 6 and also over idler pulleys 29 and 30 which are rotatably supported upon arms 31 pivotally supported at one end upon fixed brackets 33 by pins 32. Brackets 33 are fixed upon tracks 6. A compression spring 34 normally biases arm 31 upwardly about pivot 32.

The carriage 21 is arranged to be moved forwardly to the dotted line position, Fig. 1, and returned to the full line position, Fig. 1, by a screw 35 driven by electric motor 36. Screw 35 has a driving threaded fit in nut 37 fixed to carriage 21.

As elevator 8 moves upwardly, the front edge 38 of floor 11 strikes the rear portion of distributor platform 39 so that in its uppermost position the floor is tilted forwardly and downwardly, Fig. 2, thus causing the pins 5 to roll from floor 11 on to distributor floor 39. The front bar 16 is positioned sufficiently to the rear of box 8 to clear the rear edge of platform 39 when the box is raised and lowered.

Pin distributor

The distributor comprises a bottom floor 39 inclined forwardly and downwardly, side walls 40, and an endless conveyor belt 41 running about pulleys 42, Fig. 14. The conveyor pulleys 42 are connected together by a chain and sprocket drive so that the driving of the conveyor belt 41, on which pockets 43 are mounted, is positive. The chains are designated 120 and the sprockets 121. The drive between motor 48 and the conveyor sprockets comprises a Geneva movement 50 which is designed so that the conveyor will move intermittently and so that the pockets 43, when the conveyor is stopped, will align themselves accurately with openings 59 in wall 47. The Geneva movement is conventional and comprises a disk 122 fixed on drive shaft 49 and provided with a pin 123 which engages one fork 124 of the wheel 125 mounted upon shaft 126 per revolution of disk 122. Thus, forked wheel 125 is rotated one quarter revolution for each revolution of disk 122. Gear 127 is fixed on the same shaft as wheel 125 and meshes with gear 128 which drives the shaft carrying the driving sprockets for the chain and sprocket conveyor drive. For each revolution of disk 122, wheel 125 is moved one-quarter turn so that wheel 125 is stationary for three-quarters of each revolution of disk 122. During this dwell the outlet openings 58 of pockets 43 are accurately aligned with openings 59 in wall 47.

The conveyor belt has fixed thereon a plurality of open ended pockets 43. The open ended pockets can be made from sheet metal or fiber board and are fixed to the belt 41 along their line of contact therewith as at 44. The pulleys 42 are mounted upon shafts 45 which are journalled at their forward end in bearings 46 carried in the upright forward wall 47. Left hand pulley, Fig. 5, is driven by electric motor 48, shaft 49, and a conventional Geneva movement 50 so that the movement of conveyor belt 41 is intermittent, Figs. 5 and 7. Pockets 43 have their inlet openings flared outwardly as at 51.

Referring to Fig. 14 it will be seen that there are sixteen pockets 43 mounted in spaced relation about conveyor belt 41. The number of pockets 43 is optional but should, of course, preferably be greater than ten, the standard number of pins used in bowling. The bottoms of pockets 43 on the lower half of conveyor belt 41 are flush with floor 39 of the distributor so that the pins can freely slide down floor 39 and into pockets 43 as the pockets travel with the conveyor belt. It is immaterial whether the pins go into the pockets bottom end first or top end first.

To facilitate aligning the pins with the pockets 43 as they travel along the forward lower end of platform 39, an agitator is provided. The agitator comprises a shaft 52 journalled in bearings 53 mounted on the underside of platform 39. Shaft 52 is also driven by electric motor 48 by suitable gearing 54 and stub shaft 55. The distributor platform 39 is provided with a plurality of parallel spaced slots 56. A plurality of sets of spaced agitating fingers 57 are fixed in spider fashion on shaft 52 and are arranged to rotate with the shaft and in so doing pass through slots 56. Fingers 57 turn pins 5 so that the longitudinal axes of the pins are parallel to the longitudinal axes of the pockets 43. In other words, agitating fingers 57 position the pins either bottom or top foremost so that they will readily slide by gravity into the mouth of whichever pocket 43 presents itself to the pin. If the pocket is already loaded with a pin, obviously another pin will not slip into that pocket because the size or diameter of the pocket is such that it will accommodate only one pin at a time. Each pocket is slightly greater in cross section than the diameter of the pin so that the pin will have a loose or sloppy fit in the pocket. The clearance between the pin and the walls of the pocket will always be such that another pin cannot enter or even begin to enter the pocket which is already carrying a bowling pin.

The conveyor belt 41 and pin agitator preferably run continuously while the pin setting mechanism is in operation but can be shut off if desired during the time that the bowler is actually throwing the ball.

The wall 47 along which the outlet or forward ends 58 of pockets 43 travel is provided with ten openings 59, seven of which are placed in a lower horizontal row and three of which are positioned in an upper horizontal row, Fig. 14. These ten openings 59 are each controlled by a sliding door or gate 60.

Pin setter rack

The ten bowling pins and their position on the alley 1 are shown in Fig. 4. The pin setter rack is mounted on the same frame as the pin distributor so that the pin setting rack mechanism and the distributor move up and down and fore and aft together as a unit. The pin setting mechanism comprises a floor 62 provided with ten openings centered perpendicularly above the points on the alley upon which pins one to ten are set when in bowling position. These ten openings are designated 63. Fig. 5 shows these openings in vertical alignment with pins one to ten when set. Floor 62 is connected by side panels 64 at the opposite ends of the pin distributor with inclined distributor floor 39 and supports the distributing mechanism. Floor 62 is suspended at three points from carriage 21 upon screws 65 which are supported on carriage 21 perpendicularly to the alley 1. Screws 65 are tubular and provided with external threads. Each screw is journalled over a shaft 66 fixed at its upper end to carriage 21 and having an enlarged head 67 at its lower end for retaining screw 65 thereon. Anti-friction bearings can be mounted between heads 67 and the lower ends of screws 65 to carry the weight of the rack and distributor mechanisms. The pin setter rack is provided with side walls 68 which carry bosses 69 which are internally threaded and have a screw fit with screws 65. Thus, turning of screws 65 raises and lowers the pin setter rack and the pin distributor. The screws 65 are driven by electric motor 70 through stub shaft 71, horizontal shafts 72 and 73 and beveled gearing 74, Figs. 1 and 3. Thus, screws 65 rotate in synchronism to cause threaded bosses 69 to move upwardly and downwardly in unison.

For each of the ten openings in floor 62 there is a corresponding opening 59 in wall 47 of the distributor. A chute 75 runs from each opening 59 in wall 47 to its corresponding opening in the floor 62. Thus, chutes run from the three upper openings 59, Fig. 14, to the one, two, three holes in Fig. 5, and the seven openings 59 in the lower row of wall 47, Fig. 14, are connected by chutes with holes four to ten in floor 62. All of these inclined chutes and their control mechanism for the pins are identical so therefore only one will be described.

Each chute comprises a pair of spaced inclined rails 75. These inclined rails 75 extend from adjacent the lower corners of opening 59, Fig. 14, downwardly to a point adjacent its respective opening 63 in the floor 62. The rails 75 are fixed at their upper ends to wall 47 and at their lower ends to floor 62. Straddling each opening 63 is a bracket 76 which is secured at its lower end to floor 62. Bracket 76 is provided with opposed slots 77 in which are slidably mounted slides 78. These slides are connected to a U-shaped yoke 79 connected to a plunger 80 connected at its upper end to core 81 of solenoid coil 82. Thus, as solenoid 82 is energized, yoke 79 and slides 78 are pulled upwardly in bracket 76 to the top of slots 77. Levers 83 are pivotally connected by pins 84 to the lower part of bracket 76. Levers 83 are each provided with a cam opening 85. Pins 86, mounted on slides 78, project inwardly into openings 85. Levers 83 at their outer ends are connected by a yoke 87 which is fixed at its opposite ends in the ends of levers 83. Yoke 87 is provided with a V portion 88 so that is will fit around the neck of the bowling pin.

A pair of levers 89 are pivoted intermediate their ends to the rails 75 by shaft 90. The spaced levers 89 are fixed together in spaced relation by a bar 91. Levers 89 between shaft 90 and bar 91 are provided with V slots 92 in which yoke 87 is arranged to rest while in bowling pin receiving position. The opposite ends of levers 89 are fixed together in spaced relation by a shaft 93 which is arranged to engage under a pin 94 projecting forwardly from gate 60. When a pin comes to rest on the forward ends of levers 89, the levers are tilted counterclockwise (Fig. 8) thereby raising door 60 to the closed position. A pair of links 95 have a fixed pivotal connection at their upper ends with yoke 79 as at 96 and have a lost motion connection with the outer ends of shaft 93 in elongated slots 97. Thus, as the solenoid elevates yoke 79, links 95 pivot upwardly and serve to maintain door 60 in the closed position when the weight of the pin is removed from the forward ends of levers 89.

As a pin 5 falls out of discharge opening 59 from pocket 43, it slides on chute 75. If the pin is positioned bottom foremost, it simply slides down chute 75 to the dotted line position, Fig. 8, where it abuts locating stop 98 and also rests upon the forward or left-hand ends of levers 89, Figs. 8 and 11. If the pin slides out of pocket 43 top foremost, Fig. 18, then the forwardmost portion of the pin as it slides out of pocket 43 overbalances the rearmost portion of the pin and causes the pin to rotate so that its top projects downwardly exactly as shown in the full lines, Fig. 8, whereupon the top 99 of the pin engages under shaft 90 as it slides down chute 75 thereby turning pin 5 over so that the bottommost portion is now foremost and the pin comes to rest in the dotted line position shown in Fig. 8.

When solenoid 82 is energized, yoke 79 is raised thereby elevating slides 78 in slots 77 which causes pins 86 to move upwardly. As pins 86 move upwardly, they slidably engage the upper edges 100 of openings 85 which serve as cams. As pins 86 rise, they coact with cam edges 100 of levers 83 to rotate the levers counterclockwise, Fig. 8, whereupon yoke 87 contacts the neck portion 101 of the pin and moves the pin toward vertical or upright position. As the pin moves from the dotted line position, Fig. 8, to the upright position, it passes bottom foremost through opening 63 in floor 62 but yoke 87 is positioned around the neck portion 101 between the body portion 102 and the head portion 99 of the pin and yoke 87 thereby coacts with the abutment 103 (which is the upper portion of the rear face of stop 98) to grip and lock the pin in vertical position in the opening 63, as shown in Fig. 12. Since the size of head 99 of a pin 5 is greater than the clearance between yoke 87 and abutment 103, the pin cannot fall downwardly. Further, as yoke 79 is elevated by the solenoid, links 95 are swung upwardly so that shaft 93 engages beneath pin 94 and maintains door 60 in the elevated position closing opening 59 so that after the weight of the pin is removed from levers 89, another pin cannot slide down the pin chute 75 leading to an opening 63 which has already received its bowling pin.

One end of each opening 85, the uppermost end when levers 83 are in raised or pin locking position, Fig. 12, terminates in a locking notch 104 so that the weight of the bowling pin 5 cannot rotate levers 83 clockwise to release the pin. In other words, pins 86 on slides 78 engage in notches 104 so that the bowling pin itself cannot reverse or unlock yoke 87. The upper sides of notches 104 engage pins 86 such that levers 83 can only be released by a downward movement of slides 78 and pins 86, which movement is controlled by solenoid 82 and yoke 79. When a solenoid 82 is deenergized, then core 81, rod 80 and yoke 79 move downwardly by the force of gravity thereby moving slides 78 and pins 86 downwardly which in turn rotates levers 83 clockwise to thereby release the bowling pin held between yoke 87 and the stop 103. If desired, the downward motion of plunger 80 can be assisted by a spring.

*The pin sweeper*

The sweeping mechanism comprises a sweeper 105 pivotally mounted upon the ends of parallel bell crank levers 106. Levers 106 are pivoted to sliding blocks 114 by pins 107. Blocks 114 are arranged to slide fore and aft in the parallel tracks 115. The forward motion of sliding blocks 114 is arrested by stop 116. Thus, when blocks 114 abut stops 116, nuts 110 continue to travel forwardly on screws 108 and thereby rotate sweeper arms 106 counterclockwise to raise the sweeper 105. On the reverse or sweeping action, nuts 110 travel rearwardly thereby first causing arms 106 to rotate clockwise and thereby lower sweeper 105 to the dotted line position, Fig. 1. Further rotation of screws 108 causes blocks 114 to travel rearwardly in tracks 115 simultaneously with the rearward travel of nuts 110 thereby sweeping the pins off the rearmost end of alley 1 and out of the gutters into the elevator 8. Reverse rotation of screws 108 causes the sweeper to move forwardly along alley 1 and when blocks 114 abut stops 116 the sweeper is elevated to the position shown in Fig. 1.

Levers 106 are raised and lowered by screws 108 driven by an electric motor 109. Internally threaded nuts 110 on screws 108 are provided with pins 111 which engage bell crank levers 106 in elongated slots 112 to raise and lower the sweeper. The screws 108 are rotated in synchronism. The drive of the right hand screw 108, as viewed from the bowler's position, is accomplished by a chain and sprocket drive 113 from left hand screw shaft 108.

The operation of my bowling pin handling apparatus is as follows: As shown in Fig. 1, the ten bowling pins 5 are in their playing position. The pin setter rack and distributor are raised and in rearward position. The bowler throws the first ball. If the bowler does not make a strike so that some of the pins are left standing, then the circuit to motor 70 is closed so that the motor 70, driving through stub shaft 71, shafts 72 and 73, and screws 65, lowers the pin setter to its lowermost position, Fig. 12. As the pin setter lowers, openings 63 will pass downwardly about the pins that were left standing. As the pin setter rack reaches its lowermost position, the tops of the pins that were left standing will abut against spring 130 and thereby close contacts 131 which in turn closes the electrical circuit to the solenoid 82 above each particular pin. As the solenoid is energized, it draws core 81 and yoke 79 upwardly thereby raising pins 86 which act through cam slots 85 to swing arms 83 upwardly, Fig. 12, to thereby lock this pin between yoke 87 and stop 103. Each of the pins which have been left standing will be locked in the pin setter rack by this same operation. The solenoids 82 remain energized and the circuit to motor 70 is now reversed so that motor 70 reverses its direction of rotation and raises the pin setting rack to the position shown in Fig. 1. The pin setter rack as it rises carries with it those pins which were left standing after the first ball was rolled. The circuit to motor 109 is now closed so that the sweeper moves downwardly on to the alley 1, then travels toward the pit, sweeping the fallen pins off of the alley 1 and out of the gutters 132 alongside the alley 1, and thence into the elevator 8 which is now in lowered position in the pit 2. At the end of the backward sweeping motion of the sweeper 105, motor 109 reverses its rotation and thereby moves the sweeper forward and elevates the same again to the position shown in Fig. 1. At this time motor 70 is again set in operation to lower the pin setter rack which again brings the pins that were left standing after the first ball to their initial position on the alley 1. As the pin setting rack reaches its lowered position, the circuits to all the solenoids 82 are broken, as by a manual switch not shown, so that core 81 and yoke 79 move downwardly either by gravity or by the expansion of a compression spring which backs up core 81. As yoke 79 moves downwardly, pins 86 move out of notches 104 and along the lower edges 133 of openings 85 to cam arms 83 downward to their initial position, Fig. 8, thereby releasing the bowling pin. Motor 70 is now reversed to raise the pin setter rack to its initial position, Fig. 1. Suitable limit switches are provided for stopping motor 70 at the end of the upward and downward travel of the pin setter rack and for stopping the sweeper motor 109 at the end of its forward travel and a reversing switch for reversing the same at the end of the rearward travel of the sweeper.

The bowler now rolls his second ball and whether he knocks down all of the remaining pins is immaterial because motor 109 is again set in operation to sweep the remaining pins from the alley and gutters into the elevator 8 and the sweeper is then retracted to the position shown in Fig. 1. The pins as they are swept into the elevator 8 fall on to the rack 16 and the pivoted slats 15 which cooperate to present a substantially solid floor. The ball likewise falls into the elevator either directly from the rear end of the alley 1 or after striking the back cushion 3. Since slats 15 and rack 16, form a spring supported floor no injury is done either to the rack 16 or to the ball. Motor 36 is now set in operation so that screw 35 acts through nut 37 to draw carriage 21 and the raised pin setter rack and distributor forwardly or to the left, Fig. 1. As the carriage 21 moves forwardly, gear rack 23 rotates drums 26 so that cables 17 wind up on drums 26 and thereby raise elevator 8. However, as the cables 17 are drawn upwardly the box 8 and rack 16 move upwardly with cables 17 but floor 11 remains on stops 14 until shaft 12 reaches the bottoms of slots 13 in the side walls of box 8. As rack 16 moves away from floor 11, pins 5 fall through the transverse slots between bars 16 whereas the ball remains on top of the bars 16, as shown in Figs. 15 and 16. As soon as shaft 12 reaches the bottoms of slots 13, floor 11 tilts rearwardly and downwardly upon stops 18 carried by sides 10 and then moves upwardly with the box 8. Upon reaching the height of the return chute or track 4, Fig. 16, the ball rolls off bars 16, which are inclined downwardly toward the return chute 4, which returns the ball to the player in a conventional manner. Finally the elevator reaches its topmost position whereby the forward end 38 of floor 11 strikes the rearmost edge of floor 39 on the distributor thereby tilting floor 11 forwardly and downwardly. It should be remembered that as the elevator 8 rises, the pin setter rack and distributor are moved forwardly so that the distributor will move clear of the elevator. This position is shown in Fig. 2. Motor 36 is now shut off. The pins slide from inclined floor 11 on to the distributor floor 39 where they are agitated by the rotary agitator 52 and aligned with the pockets 43 which are being moved with a step by step or intermittent motion by motor 48 and Geneva movement 50. Each pin finds a pocket 43 in the distributor and is carried about by this pocket until it reaches an opening 59 in the forward wall 47 of the distributor which is open, that is, one wherein the door 60 is lowered indicating that the opening 63 in the pin setter floor at the opposite end of chute 75 leading from such opening 59 is free to receive a pin to be set preparatory to setting the pin in the position on the alley corresponding to such unoccupied opening 63 in the pin setter rack floor 62. As the pin tumbles out of opening 59 on to the inclined track 75, it is inverted or turned over so that its body 102 is positioned forward of its top 99, dotted line showing Fig. 8.

After the pins are distributed by the distributing pockets 43 and chute 75 to the positions over their respective openings 63 in the floor of the pin setter rack 62, as indicated in the dotted line showing Fig. 8, solenoids 82 are energized by a manual switch not shown, thereby raising yoke 79 which acts through slides 78, pins 86 and cam slots 85 to elevate levers 83 and raise the pins to vertical position with a yoke 87 surrounding the neck 101 of each pin and coacting with stop 103 to lock the same in upright position in opening 63, as shown in Fig. 12. The pin setter rack is returned to its rearward position by operating motor 36 and motor 70 is then set in operation to lower the pin setter rack and pins to their respective positions on the alley. After the pins are set upon the alley, solenoids 82 are deenergized which causes yokes 79 and associated parts to release the locking yokes 87 from the pins. Motor 70 is now reversed and the pin rack raised whereupon the pins are in set position ready for play.

As the pins roll down its respective chute 75, it rests upon the forward end of levers 89 thereby tilting the same counterclockwise, Figs. 8 and 19, and elevating the door 60 to closed position, thereby preventing another pin from being fed down this same chute 75. Slots 97 in arms 95 permit shaft 93 to move upwardly as doors 60 are elevated by the weight of the pin. When solenoid 82 elevates yoke 79, then links 95 act to maintain door 60 in the elevated position closing opening 59 during the resetting of pins such as when all the pins are not knocked down by the first ball rolled.

It is understood, of course, that the pin setter rack is always in the rearmost position during the setting of the pins and is moved forwardly only when the pins and ball are being elevated from pit 2 by means of elevator 8 on to the distributor floor 39 and return chute 4, respectively. After the pins are elevated on to the distributor floor, the pin setter rack and distributor are moved to rearmost position by motor 36 and screw 35.

It is, of course, appreciated that the drive for each of the component parts of this pin setting mechanism can be either independently or automatically controlled. Preferably the drive for each of these mechanisms is an electrical drive. If the mechanisms are independently controlled, then a separate circuit will be provided for the pin sweeper motor 109, the carriage motor 36, the pin setter rack elevating and lowering motor 70, the solenoids 82, and the distributor motor 48. In such case the circuits to these motors and solenoids will be controlled by independent switches operated in accordance with the demands of the game, that is, if the ball is thrown into the gutter and none of the pins are struck down, then motor 36 alone will be set in operation to elevate the ball into the return chute 4. This will entail moving carriage 21 forwardly and then backwardly to raise and lower the ball elevator 8. If a strike is not rolled then motor 70 will first be set in operation to lower the pin setter rack 62 to pick up the pins that were not knocked down and after the pin setter 62 has been elevated with the pins which were not knocked down, motor 109 will be set in motion to sweep from the alley and gutters the pins which were knocked down. Motor 48 for the distributor can be run continuously if desired. After the alley has been swept, then motor 70 will be reversed to lower the pins which were not knocked down by the first ball rolled to their original position and pin setter rack 62 again raised whereupon the second ball can be thrown.

In the case of a strike, or after two balls have been thrown, then sweeper motor 109 is set in operation to sweep the alley and gutters clear and deposit the pins in the elevator 8. After the sweeper has completed its sweeping and return cycle, then motor 36 is set in operation to elevate the pins on to the inclined distributor platform 39 and to return the ball via return chute 4. After the pins have been deposited on distributor floor 39, motor 36 is reversed to return carriage 21 and the pin setter rack and distributor which carriage 21 supports, to their rearmost position. After the pins have been fed onto the pin setter rack 62, solenoids 82 are actuated to raise yokes 79 and position the pins in vertical position in their openings 63 with the bottoms of the pins down and the necks of the pins locked between yokes 87 and stops 103. While the carriage 21 is in its rearmost position, motor 70 is set in operation to lower the pin rack 62 down, solenoids 82 are deenergized to release the pins in their respective playing positions on the alley, motor 70 is reversed to elevate pin setter rack 62 and the pins are now ready for play. The circuits and switches for each of the several electric driving motors and solenoids are not shown.

As used herein the front of the bowling alley means the portion of the alley from which the ball is thrown and the rear of the bowling alley is the part of the bowling alley toward which the ball rolls and where the pins are positioned.

The modified form of pin setting device shown in Fig. 23 differs from the principal form described above only in that solenoid 82 is not depended upon for elevating yoke 79 when the pin setter is lowered to pick up pins not knocked down with the first ball. When the pin setter is lowered to pick up a pin, the pin gripping mechanism is in the position shown in Fig. 8. As the opening 63 passes over a standing pin, the head 99 of the pin, as shown in Fig. 23, engages the cross portion of yoke 79 thereby elevating yoke 79 relatively to floor 62 as the floor 62 continues to be lowered. Actually, the head 99 of the pin arrests further lowering movement of yoke 79. Thus, as the pin setter floor 62 and associated mechanism continues to lower, the arrested movement of yoke 79 acts through slides 78, pins 86, cam openings 85 to tilt levers 83 upwardly, Fig. 8, which brings yoke 87 up into contact with the neck 101 of the pin to thereby lock the same between yoke 87 and abutment 103. This brings pins 86 into locking notches 104 so that the standing pin will now be elevated when the pin setter is again raised preparatory to sweeping the knocked down pins from the alley. Upon lowering the pin setter to reset these pins, previously left standing the yoke 79 can be lowered manually or mechanically or by reversing the flow of current in solenoid 82 to thereby repel or move core 81 outwardly of the solenoid and lower yoke 79 which will release the pin. The pin will be released by this action since even a slight downward movement of yoke 79 produces a corresponding downward tilting of levers 83 and yoke 87 which in turn permits the yoke 79 to travel progressively further in a downward direction. In such case core 81 would have a wire winding the same as the solenoid coil with a direct current flowing therethrough. Reversing the current in the solenoid winding would change the polarity of the solenoid coil and repel the core.

I claim:

1. In a pin setting machine for a bowling alley, a pin setter rack having an opeing through which a pin is adapted to be discharged, an inclined track for delivering a pin to said opening, means on said inclined track for inverting a pin traveling head foremost down the track so that it comes to rest in an inclined position bottom foremost on said rack, and means for tilting said pin to an upright position and releasably locking the same in said position in said opening prior to discharge of the pin through said opening.

2. The combination as set forth in claim 1 wherein the means for tilting the pin to an upright position in the opening in the pin setter rack and releasably locking the same comprises a pair of levers arranged to straddle the opening, a yoke carried by said levers and adapted to engage the neck of a pin in said inclined position, a stationary stop supported by the pin setter rack adjacent the opening, and means for pivoting the levers upwardly whereby the yoke engages the neck of the pin and moves it into engagement with said stationary stop to thereby stand the pin bottom-end down and to releasably lock the pin between the said stop and the yoke in elevated position.

3. In a pin setting machine for a bowling alley, a pin setter rack having an opening through which a pin is adapted to be discharged, an inclined track for delivering a pin to said opening, means on said inclined track for inverting a pin traveling head foremost down the track so that it comes to rest in an inclined position bottom foremost on the rack, means for tilting the pin to an upright position in the opening in the pin setter rack comprising a pair of levers arranged to straddle the opening, a yoke caried by said levers and adapted to engage the neck of a pin in said inclined position, a stationary stop supported by the pin setter rack adjacent the opening, means for pivoting the levers upwardly whereby the yoke engages the neck of the pin and moves it into engagement wtih said stationary stop to thereby stand the pin bottom-end down and to releasably lock the pin between the said stop and the yoke in elevated position, and means for lowering the pin setter rack whereby the pin is set upon the alley, and means for retracting the yoke from the neck of the pin to thereby release the same preparatory to elevating the pin setter rack above the said pin.

4. In a pin setting machine for a bowling alley, a floor having an opening therein arranged to move upwardly and downwardly with respect to the bowling alley, said opening in the floor being large enough to pass a pin standing on the alley when the pin setter floor is lowered so that the neck of the pin will project above the floor, a pair of inclined tracks leading to said opening for delivering a pin to said opening in an inclined position, a stationary stop carried by said floor adjacent said opening, a pivoted yoke on said floor arranged to swing upwardly from a position disposed between said tracks into engagement with the neck of said pin standing on the alley to lock the same between the yoke and the stationary stop, and means actuated in the lowering of the pin setter by contact with the head of the pin to swing the yoke automatically into locking engagement with the pin, said yoke when disposed between said tracks being adapted to engage the neck of a pin disposed in an inclined position at the lower end of the track and tilt the pin to an upright position when the yoke is swung upwardly.

5. In a pin setting machine for a bowling alley, the combination of a pin setter rack having a plurality of openings therein corresponding to the positions of the pins on the alley, an inclined track leading to each of said openings, a gate for barring the inlet end of said inclined track, a pivoted lever having one end operatively associated with said gate and the other end projecting into the path of the pin as it travels down said inclined track, said last mentioned end of said lever being arranged to be engaged by a pin traveling down said inclined track to pivot said lever and thereby shift said gate to a position barring the inlet end of said inclined track.

6. The combination set forth in claim 5 including means on said track for causing said pin to come to rest in the lower end of said track in an inclined position on said rack adjacent said opening, means for tilting said pin to an upright position in said opening out of engagement with said last mentioned end of said lever, and means connected with said tilting means for holding said gate in a position barring said inlet end of said track when the pin is tilted to an upright position out of engagement with said last mentioned end of said lever.

References Cited in the file of this patent

UNITED STATES PATENTS

| Number | Name | Date |
| --- | --- | --- |
| 809,245 | Brinkmeyer | Jan. 2, 1906 |
| 1,068,131 | Holland | July 22, 1913 |
| 1,190,651 | Hedenskoog | July 11, 1916 |
| 1,590,124 | Roble | June 22, 1926 |
| 1,852,870 | Williams | Apr. 5, 1932 |
| 1,896,383 | White | Feb. 7, 1933 |
| 2,015,428 | Hedenskoog | Sept. 24, 1935 |
| 2,307,839 | Kaufman | Jan. 12, 1943 |
| 2,319,925 | Flanagan | May 25, 1943 |
| 2,341,475 | Parra et al. | Feb. 8, 1944 |
| 2,530,385 | Frye | Nov. 21, 1950 |